(12) United States Patent
Barnard et al.

(10) Patent No.: US 10,972,564 B2
(45) Date of Patent: *Apr. 6, 2021

(54) SYSTEM AND METHOD FOR AUTOMATING ACTIONS IN DISTRIBUTED COMPUTING

(71) Applicant: ServiceNow, Inc., Santa Clara, CA (US)

(72) Inventors: Bryan Mather Barnard, Chicago, IL (US); Mark Brennan, Oceanside, CA (US); Rebecca Anita Dias, Kirkland, WA (US); Natallia Rabtsevich Rodriguez, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,565

(22) Filed: Jan. 7, 2020

(65) Prior Publication Data

US 2020/0213262 A1     Jul. 2, 2020

Related U.S. Application Data

(63) Continuation of application No. 15/588,311, filed on May 5, 2017, now Pat. No. 10,541,961.

(51) Int. Cl.
*H04L 29/08*     (2006.01)
*H04L 12/58*     (2006.01)
*G06F 11/36*     (2006.01)
*G06F 9/54*      (2006.01)

(52) U.S. Cl.
CPC .............. *H04L 67/26* (2013.01); *G06F 9/542* (2013.01); *G06F 11/3672* (2013.01); *H04L 51/08* (2013.01); *H04L 51/24* (2013.01); *H04L 67/02* (2013.01); *H04L 67/1095* (2013.01); *H04L 51/10* (2013.01)

(58) Field of Classification Search
CPC ..... H04L 29/06; H04L 67/26; H04L 67/1095; H04L 67/306; G06F 16/2358; G06F 9/542; G06F 11/3672
See application file for complete search history.

(56) References Cited

U.S. PATENT DOCUMENTS

| | | | |
|---|---|---|---|
| 5,721,825 A * | 2/1998 | Lawson | G06F 9/542 709/203 |
| 6,321,229 B1 | 11/2001 | Goldman | |
| 6,609,122 B1 | 8/2003 | Ensor | |
| 6,678,887 B1 | 1/2004 | Hallman | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |

(Continued)

Primary Examiner — Kyung H Shin
(74) Attorney, Agent, or Firm — Fletcher Yoder PC

(57) ABSTRACT

Systems, methods, and media for actions in distributed computing by receiving trigger event specification that defines a trigger event that will cause a notification to be transmitted. A determination is made whether the trigger event has occurred. Responsive to the determination that the trigger event has occurred, a notification is generated. Excess data is removed from the notification. The notification, with the excess data removed, is sent.

20 Claims, 13 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Nvarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,983,982 B2 | 3/2015 | Rangarajan |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2002/0042846 A1* | 4/2002 | Bottan .................... H04L 67/26 709/249 |
| 2006/0036910 A1* | 2/2006 | Fung ................... G06F 11/3672 714/25 |
| 2018/0285405 A1* | 10/2018 | Chan ................... H04L 67/1095 |

\* cited by examiner though it is US 10,972,564 B2

SYSTEM AND METHOD FOR AUTOMATING ACTIONS IN DISTRIBUTED COMPUTING

CROSS REFERENCE TO RELATED APPLICATIONS

This application is a continuation of U.S. application Ser. No. 15/588,311, filed May 5, 2017 the contents of which is herein expressly incorporated by reference for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with each having its own functions, properties, and/or permissions. Such resources may include hardware resources, such as computing devices, switches, and the like. Additionally or alternatively, the resources may include software resources, such as database applications, application programming interfaces (APIs), and the like. However, these resources may have different requirements and/or methods of use that may not function as intended when interacting with each other.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in this electronics-driven world. As more and more functions are performed by services using some form of distributed computing, the complexity of IT network management can drastically increase. The services and/or goods may use one or more APIs. A variety of APIs may utilize different credentials and/or connections. This information may be difficult to utilize for the consumers consuming the APIs without some labeling and/or cataloging of the information that may be consumed by the APIs. Thus, a labeling scheme may be used to organize connection and/or credential information for consumption by the APIs.

Furthermore, testing of calls to the APIs may be automated using an automated testing framework (ATF). In some embodiments, the ATF may utilize an API explorer that is used to define parameters and/or operations of a test for an item calling the API.

Various modules, such as APIs and/or ATF, may invoke notifications (e.g., emails) in response to various triggers and/or actions. These actions may generate a large number of notifications with superfluous and/or redundant content. Thus, these notifications may be compared together to reduce redundancy and reduce congestion of an inbox for the notifications without sacrificing data. For example, notifications (e.g., emails) to a project review board updating a status, issues, and/or project barriers may have logos (e.g., corporate logos), duplicate images, and/or duplicate attachments removed before sending the notification. Furthermore, date/time fields without time zone may be updated with time zone information to correctly identify time.

Figure 1:
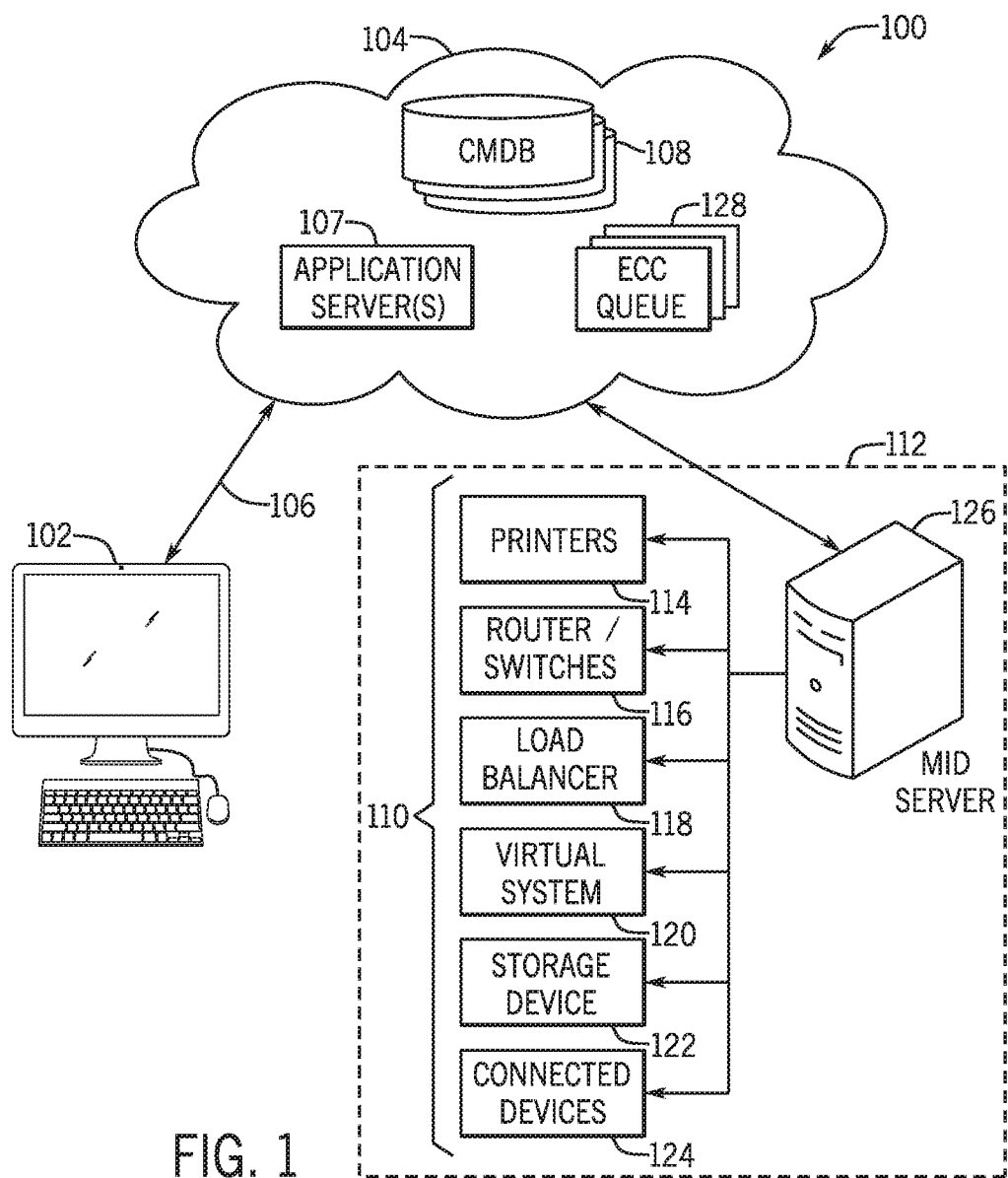
FIG. 1 is a block diagram of a distributed computing system, in accordance with an embodiment.

FIG. 1 is a block diagram of a system 100 that utilizes distributed computing. As illustrated a client 102 communicates with a cloud service 104 over a communication channel 106.

The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 may be implemented using a single physical unit or a combination of physical units (e.g., distributed computing) running one or more client application programs. Furthermore, in some embodiments, a single physical unit (e.g., server) may run multiple client application programs simultaneously.

The cloud service 104 may include any suitable number of computing devices (e.g., computers) in one or more locations that are connected together using one or more networks. For instance, the cloud service 104 may include various computers acting as servers in datacenters at one or more geographic locations where the computers are connected together using network and/or Internet connections. The communication channel 106 may include any suitable communication mechanism for electronic communication between the client 102 and the cloud service 104. The communication channel 106 may incorporate local area networks (LANs), wide area networks (WANs), virtual private networks (VPNs), cellular networks (e.g., long term evolution networks), and/or other network types for transferring data between the client 102 and the cloud service 104. For example, the communication channel 106 may include an Internet connection when the client 102 is not on a local network common with the cloud service 104. Additionally or alternatively, the communication channel 106 may include network connection sections when the client and the cloud service 104 are on different networks or entirely using network connections when the client 102 and the cloud service 104 share a common network. Although only a single client 102 is shown connected to the cloud service 104, it should be noted that cloud service 104 may connect to multiple clients (e.g., tens, hundreds, or thousands of clients).

Through the cloud service 104, the client 102 may connect to various devices with various functionality, such as gateways, routers, load balancers, databases, application servers running application programs on one or more nodes, or other devices that may be accessed via the cloud service 104. For example, the client 102 may connect to an application server 107 and/or a database 108 via the cloud service 104. For example, the database 108 may include a configuration management database (CMDB), data (e.g., time-series) storage databases, relational databases, and/or any other suitable database types. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the cloud service 104. The application nodes may be implemented using processing threads, virtual machine instantiations, or other computing features of the application server 107. Moreover, the application nodes may store, evaluate, or retrieve data from a database and/or a database server 108.

The database 108 is a series of tables containing information about specific items. For example, in a CMDB, the tables include information about all of the assets and business services controlled by a client 102 and the configurations of these assets and services. The assets and services include configuration items (CIs) 110 that may be computers, other devices on a network 112 (or group of networks), software contracts and/or licenses, or business services that may be tracked by, used by, and/or accessed by one or more databases of database 108. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices, such as heating, ventilation, and air conditioning (HVAC) units, fuel tanks, power equipment, and/or the like.

As previously mentioned, additional to or in place of the CMDB, the database 108 may include one or more other database servers. The database servers are configured to store, manage, or otherwise provide data for delivering services to the client 102 over the communication channel 106. The database server includes one or more databases (e.g., CMDB) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the cloud service 104 may have access to one or more databases external to the cloud service 104 entirely.

Access to the CIs 110 from the cloud service 104 is enabled via a management, instrumentation, and discovery (MID) server 126 via an External Communications Channel (ECC) Queue 128. The MID server 126 may include an application program (e.g., Java application) that runs as a service (e.g., Windows service or UNIX daemon) that facilitates communication and movement of data between the cloud service 104 and external applications, data sources, and/or services. The MID server 126 may be executed using a computing device (e.g., server or computer) on the network 112 that communicates with the cloud service 104. As such, in some embodiments, the MID server 126 may connect back to the cloud service 104 using a virtual private network connection that simulates the CIs 110 being connected to the cloud service 104 on a common physical network.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the cloud service 104 that communicates with a border gateway device of the network 112.

The communication queue 128 may be a database table that is typically queried, updated, and inserted into by other systems. Each record in the communication queue 128 is a message from an instance in the cloud service 104 to a system (e.g., MID server 126) external to the cloud service 104 that connects to the cloud service 104 or a specific instance running in the cloud service 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message.

Figure 2:
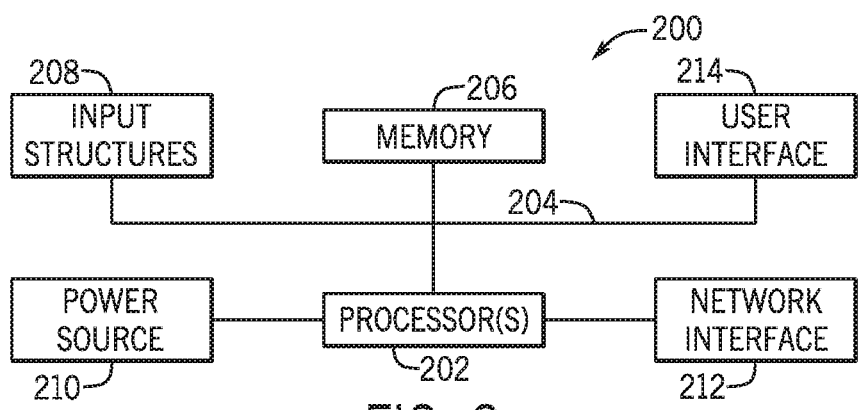
FIG. 2 is a block diagram of a computing device utilized in the distributed computing system of FIG. 1, in accordance with an embodiment.

FIG. 2 generally illustrates a block diagram of an embodiment of an internal configuration of a computing device 200. The computing device 200 may be an embodiment of the client 102, the application server 107, a database 108 (e.g., CMDB), other servers in the cloud service 104 (e.g., server hosting the ECC queue 128), device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other circuitry performing functions by executing instructions stored in the memory 206 or in another accessible location. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

Figure 3:
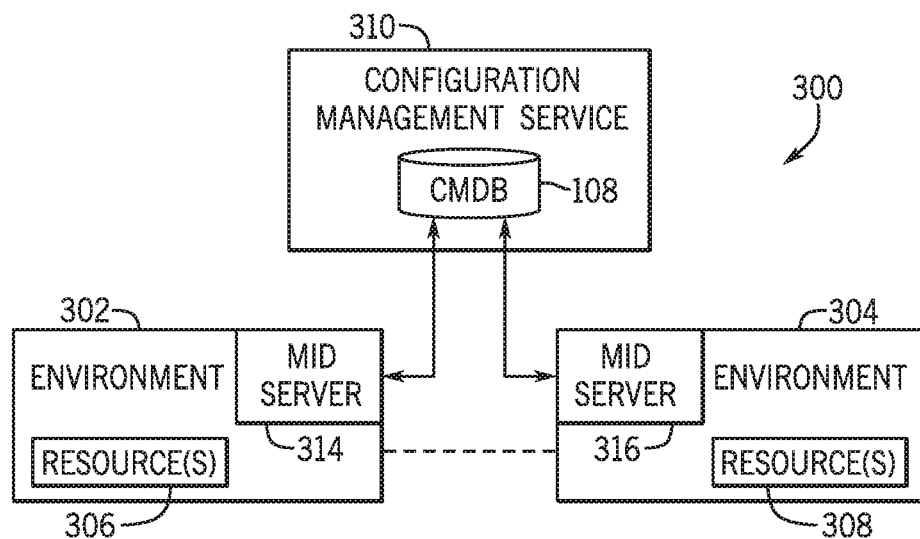
FIG. 3 is a block diagram of an electronic computing and communication system that utilizes the distributed computing system of FIG. 1, in accordance with an embodiment.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, FIG. 3 is a block diagram of an embodiment of an electronic computing and communication system 300 for managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account and/or role including resources that may be spatially distant from each other. In some embodiments, resources 306, 308 of the environments 302, 304 may communicate with each other across environments. However, in some embodiments, aspects of various environments may be provided by different vendors without communication therebetween. In such embodiments, the resources of disparate environments may communicate using the cloud service 104 (e.g., a management service 310 including the cloud service 104). The resources 312 and 314 may be any suitable configuration item 110 previously discussed.

The management service 310 may include one or more servers providing access to and managing the database 108. The management service 310 may allocate or provision resources, such as application instances in the resources 306 or 308, from a respective environment 302 or 304. Further, the management service 310 may create, modify, or remove information in the database 108. For example, the management service 310 may manage a catalogue of resources in more than a single environment (even if the environments may not directly communicate with each other). Using this catalogue, the management service 310 may discover new resources, provision resources, allocate resources, modify, and/or remove resources from the catalogue across a single environment or multiple environments. In some embodiments, these actions may be initiated using the client 102, scheduled for periodic occasions, or a combination thereof. For example, a client 102 may receive a request, via its input structures, to query an identity of an application program interface (API) used by a resource to access a particular vendor/provider for the environment 302 that is passed to the management service 310 to query the database 108. As another example, the client 102 may receive a request, via its input structures, to query an identity of a user authorized to access a particular resource that is passed to the management service 310.

In the illustrated embodiment, each environment 302 and 304 has its own MID server 314 and 316. In some embodiments, a single MID server may be employed when the MID server may reach into multiple environments. For example, if the MID server is run in the cloud service 104 (e.g., in the management service 310), a single MID server may be used to manage both environments 302 and 304. Additionally or alternatively, if the MID server 314 has access to the environment 304, the MID server 316 may be omitted.

Managers of the networks and devices may utilize connections and credentials within a management service 310 that is consistent between all access points. Connections include target host/IP required by outbound integration mechanisms along with credentials being used. The credentials include authentication and security keys for external systems access via the management service 310. These credentials and connections may be associated using labels. Using these labels a manager may configure environment-specific connection and credential groupings. Furthermore, application programming interfaces (APIs) may be used within the management service 310 and/or the MID servers 314 and/or 316 to retrieve connection and/or credential information based on a given label and label type.

Figure 4:
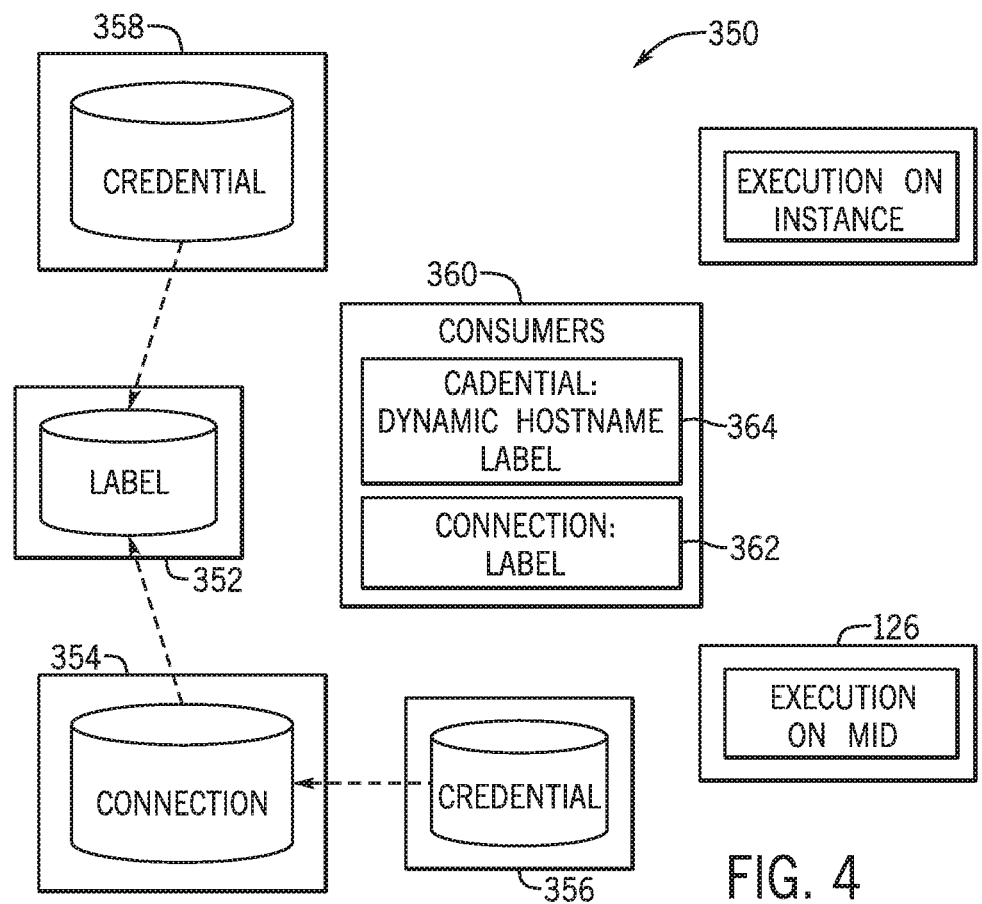
FIG. 4 is a schematic diagram illustrating a label creation process, in accordance with an embodiment.

FIG. 4 illustrates a schematic diagram of a process 350. A consumer (e.g., via the client 102) creates a label 352. The consumer may be any process that may "consume" or use the API. For example, the consumer may include orchestration, discovery, service mapping, importing, exporting, cloud management, and/or other similar data management disciplines. Orchestration may include automation of simple or complex tasks that may be performed on remote servers that may or may not be performed manually. Moreover, orchestration may include multi-system tasks and include one or more other management disciplines included previously noted. Orchestration may also interact with any suitable type of infrastructure, such as applications, databases, and/or hardware. For instance, orchestration may include mail servers, file servers, secure shell (SSH) activities, directory activities, cloud activities, and/or other management related activities.

Discovery may be used to discover information about the CIs 110. Service mapping collects data about CIs 110 (e.g., via discovery), generates a map of CIs 110 and their connections, and stores the map in the CMDB. Some of the consumers may utilize a persistent connection (e.g., static address) while others may utilize a dynamic connection (e.g., dynamic address at runtime, mapping that may change, etc.). Furthermore, the consumers may use one or more sets of known credentials regardless of whether the connection is persistent or dynamic. For example, orchestration may utilize persistent connections, dynamic connections, or a combination of persistent and dynamic connections concurrently. Discovery may utilize a dynamic connection with a list of associated credentials used in the discovery. Service mapping similarly may utilize a dynamic connection and known credentials by CI 110 and/or types of CIs 110. Importing, exporting, and/or cloud management may use persistent connections with known credentials. Furthermore, cloud management may bind a single account (e.g., administrator account) to multiple known credentials.

Returning to FIG. 4, if an address/location is known/persistent for the label 352, a connection 354 is created and associated with credentials 356 and the label 352. However, if the address/location is dynamic, the connection 354 is not associated with the label 352. Instead, the label 352 is designated as a credential label and associated with credentials 358 only. In some embodiments, the credentials 356 and the credentials 358 may at least partially include the same credentials. For example, the credentials 356 and the credentials 358 may share at least one username and password while the credentials 356 and/or the credentials 358 may include some credentials that are not included in the other set of credentials. In some embodiments, the credentials 356 and/or the credentials 358 may include only one set (e.g., username and password) of credentials each.

When a consumer 360 is to use connections, the consumer 360 may specify a connection label 362 by specifying a label that has been associated with a connection 354. When a hostname or location is dynamically populated at runtime, the consumer 360 may instead utilize a credential label 364 by specifying a label that has been associated with a credential. During execution, the label 352 is used by an instance on the application server and/or the MID server 126 to connect to and/or authenticate with a target location as identified in the label 352.

Figure 5:
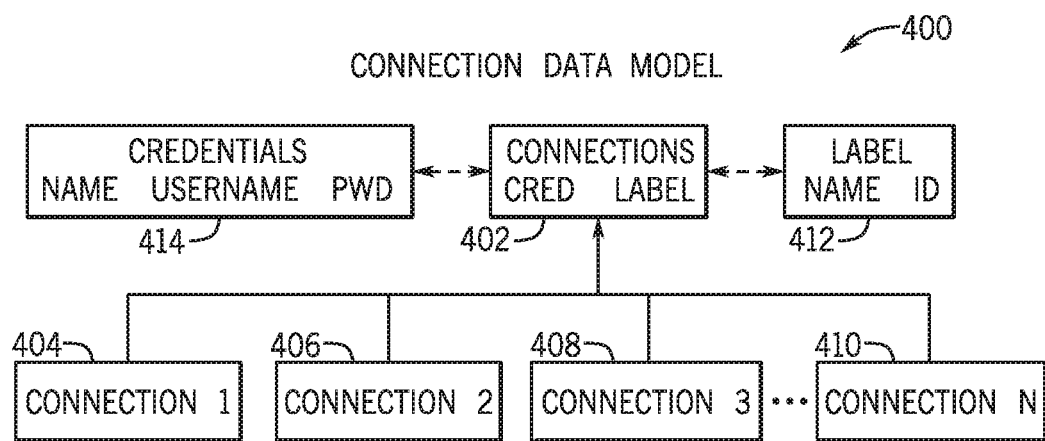
FIG. 5 illustrates a data model for connection labeling used in the label creation process of FIG. 4, in accordance with an embodiment.

FIG. 5 illustrates a data model 400 of connection labelling. The data model 400 includes a connections table 402 that includes information for connections 404, 406, 408, and 410. The connections 404, 406, 408, and 410 may include one or more end points, uniform resource locators (URLs), and/or other data about a location of a target to be connected to. The connections 404, 406, 408, and 410, as entries in the connections table 402, inform consumers 360 how to connect to an end device by providing a hostname, an address, a port, a URL, and/or other information instructing how to connect to a target device. The connections table 402 is also connected to or extended as a connection label table 412. The connection label table 412 references connection labels in the connection table 402 thereby coupling consumers 360 to connection information indicated in the connection label table 412. Each label in the connection label table 412 identifies a connection (e.g., connection 404) and/or a credential from a credential table 414 for the connection. In the label table 412, each entry may include a name field and an identifier. The name field provides a name for the label, and the identifier includes a calculated field that is derived from the name field and another field. For example, the identifier may be the value in the name field combined with a scope name field. The scope name field indicates the extent to which the label is to be used. For example, the scope name may include a global indicator in the scope name field to indicate that the label may be used for any consumer types, application types, users, or any other purposes. Alternatively, the scope name may be limited to a specific use, such as to specific consumer types, users, application types, and the like. In some embodiments, each identifier is unique to each credential label. In other words, an identifier for a specific scope may only have one corresponding label with the same name.

In some embodiments, the connections table 402 supports domain separation separating data into logically-defined domains to enable: data segregation between entities, customization of process definitions and user interfaces for each domain, and/or maintaining some global processes and reporting in a single instance.

Figure 6:
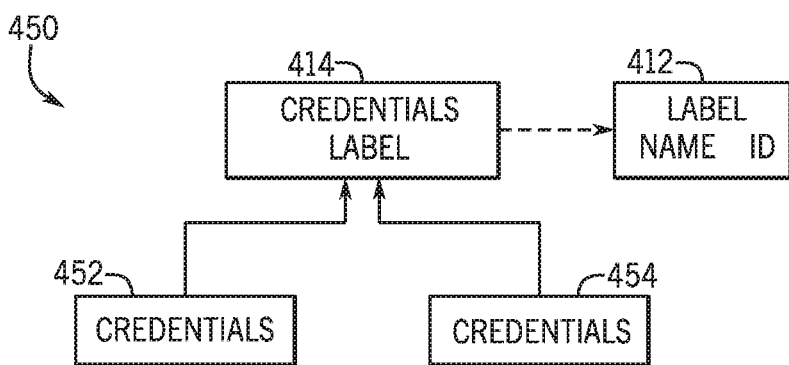
FIG. 6 illustrates a data model for credential labeling used in the label creation process of FIG. 4, in accordance with an embodiment.

FIG. 6 illustrates a data model 450 for a credential label. As previously noted, the credential table 414 includes credentials 452 and 454. The credentials 452 and 454 may include Common Information Mode (CIM) credentials, Simple Network Management Protocol (SNMP) credentials, SSH credentials, SSH private key credentials, operating system (OS) credentials, cloud service credentials, other device credentials, or any combination thereof. The credentials may include identifiers (e.g., username, account number, etc.) and an associated password or key used to authenticate connection using the identifiers.

Figure 7:
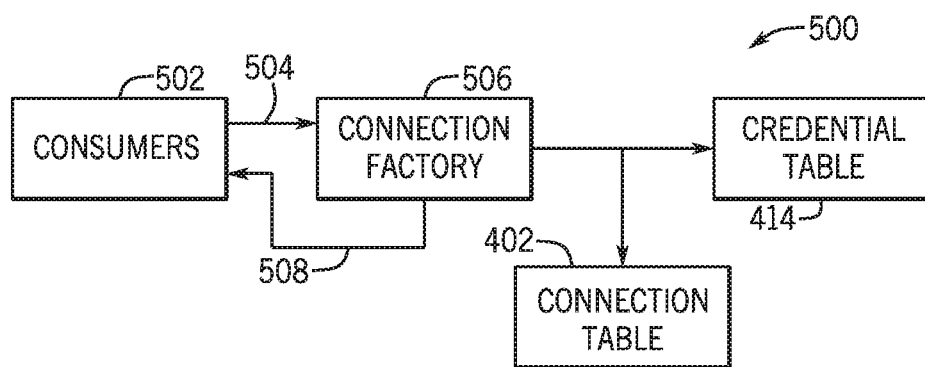
FIG. 7 illustrates a process for consuming labels of a connection type, in accordance with an embodiment.

FIG. 7 illustrates a process 500 for consuming labels of the connection type. When a consumer 502 has a persistent connection/known target (e.g., hostname, address, URL, etc.) to connect to, the consumer 502 sends a request 504 to a connection factory 506 implemented in the platform 104. The request 504 includes a connection label. The connection factory 506 pulls the associated connection information and credential information from the connection table 402 and the credential table 414. The connection factory 506 then returns a connection and credential object 508 including the connection and credential information.

Figure 8:
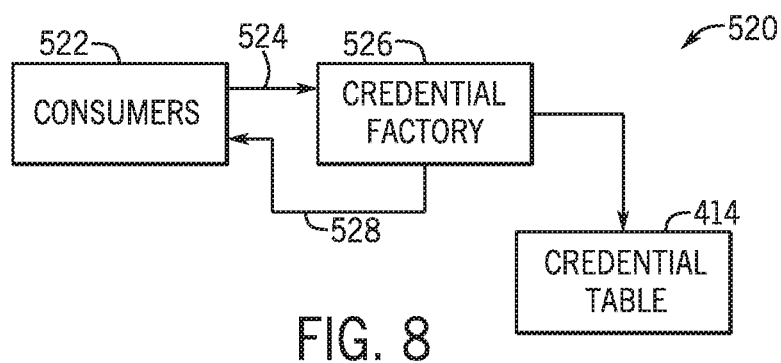
FIG. 8 illustrates a process for consuming labels of a credential type, in accordance with an embodiment.

FIG. 8 illustrates a process 520 for consuming labels of the credential type. When a consumer 522 has a dynamic connection (e.g., address/hostname determined at runtime), the consumer 522 sends a request 524 to a credential factory 526 implemented in the platform 104. The request 524 includes a connection label. The credential factory 526 pulls the associated credential information from the credential table 414. The credential factory 526 then returns a connection object 528.

Figure 9:
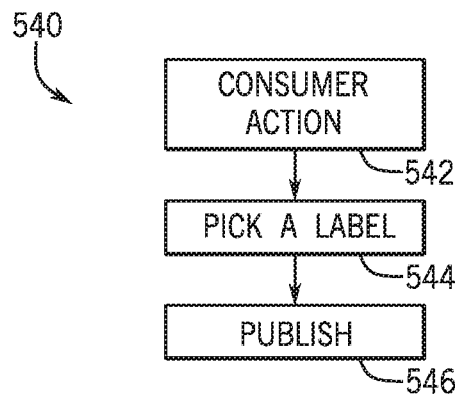
FIG. 9 illustrates a process for consuming labels of a suitable type, in accordance with an embodiment.

FIG. 9 illustrates a process 540 for consuming labels. The consumer (e.g., consumer 502 and/or 504) attempts to perform an action (block 542). This action utilizes a connection. Thus, the consumer picks an appropriate connection label (block 544). Choosing the appropriate label includes choosing a credential type or a connection type for the label. For example, when the consumer has a preconfigured endpoint (e.g., persistent connection), the consumer may choose a connection type label. Additionally or alternatively, when the consumer receives a hostname/endpoint dynamically at runtime, the consumer may choose a credential type label. The consumer then publishes to or requests the label from the connection factory 506 and/or the credential factory 526 (block 546). The credential factory 506 and/or the credential factory 526 may be implemented on the platform 104 (e.g., the application server 107) and/or on the MID server 126. In some embodiments, the credential factory 506 and the connection factory 526 may be embodied in a common component (e.g., hardware or software) that performs functions of both the credential factory 506 and the connection factory 526.

Figure 10:
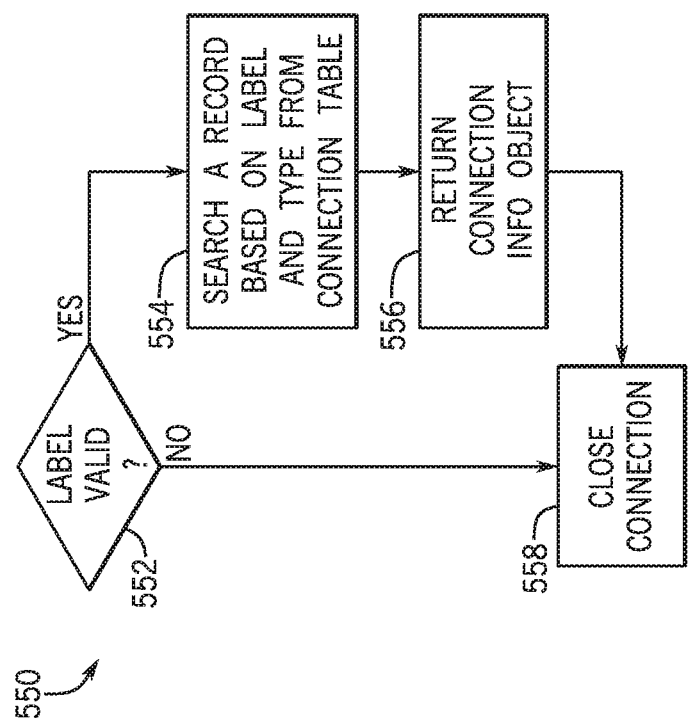
FIG. 10 illustrates a process reflecting a response of a connection factory to a connection label transmitted from the consumer, in accordance with an embodiment.

FIG. 10 illustrates a process 550 reflecting a response of the connection factory 506 to a connection label transmitted from the consumer. The connection factory 506 determines whether the label is valid (block 552). For example, the connection factory 506 determines whether the requested/published label is formatted properly. Additionally or alternatively, such determination may be made after searching the connection table 402 to determine whether a valid record exist in the connection table 402 as an indicator of whether the label is valid. If the label is valid, the connection factory 506 searches for one or more records based on the label and the type (e.g., connection) of the label from the connection table 402 (block 554). Upon discovery of the record(s), the connection factory 506 returns connection information associated with the label to the consumer (block 556). This connection information may include information for connection to one or more hostnames/endpoints. The connection information may also include associated credentials for at least some of the hostnames/endpoints included in the connection information. After finding the record and/or designating the request as invalid, the connection factory 506 may close the connection to the consumer (block 558).

Figure 11:
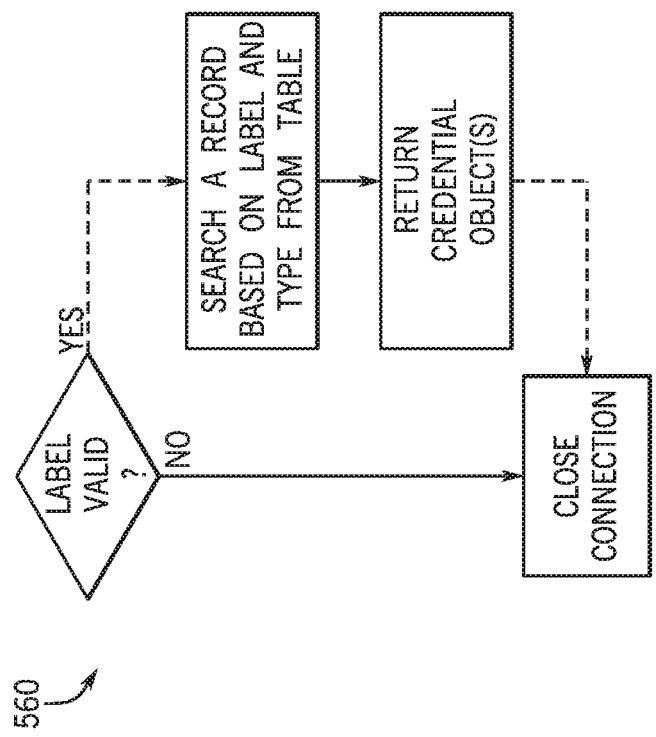
FIG. 11 illustrates a process reflecting a response of a credential factor to a credential label transmitted from the consumer, in accordance with an embodiment.

FIG. 11 illustrates a process 560 reflecting a response of the credential factory 526 to a credential label transmitted from the consumer. The credential factory 526 determines whether the label is valid (block 562). For example, the credential factory 526 determines whether the requested/published label is formatted properly. Additionally or alternatively, such determination may be made after searching the credential table 422 to determine whether a valid record exist in the credential table 422 as an indicator of whether the label is valid. If the label is valid, the credential factory 526 searches for one or more records based on the label and the type (e.g., credential) of the label from the credential table 422 (block 564). Upon discovery of the record(s), the credential factory 526 returns credential info associated with the label to the consumer (block 566). The connection information includes one or more credentials that are to be used by the consumer to connect to hostnames/endpoints even if the hostname/endpoint is determined at runtime. After finding the record and/or designating the request as invalid, the credential factory 526 may close the connection to the consumer (block 568).

Figure 12:
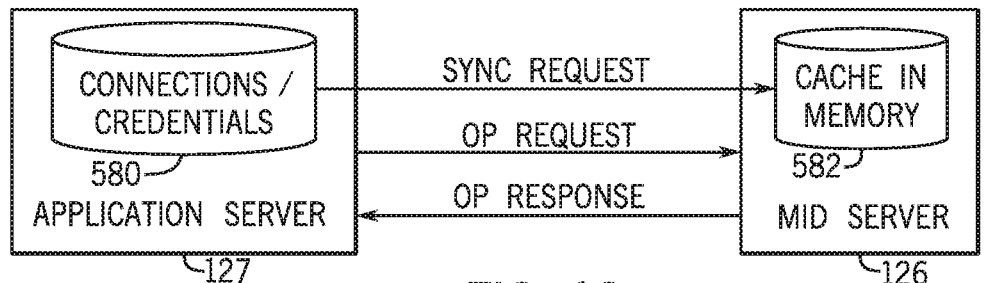
FIG. 12 illustrates data caching between a discovery server and an application service, in accordance with an embodiment.

As previously noted, labels may be used to access connection/credential information from the application server 127 and/or the MID server 126. As illustrated in FIG. 12, in some embodiments, the data may be accessed via the MID server 126 because connection/credential information may be cached on the MID server 126 from the application server 126 and/or other locations used in the platform 104. The application server 127 (or the database 128) may store the connection/credentials information in one or more databases 580 (e.g., connection table 402 and credential table 422) that the MID server 126 caches in local memory 582. Such caching may occur by a push from the one or more databases 580 to the local memory 582 of the MID server 126. Alternatively, the MID server 126 may request a synchronization from the one or more databases 580. During operation, the application server 127 sends operation requests 584 to the MID server 126, and the MID server 126 responds with operation responses 586 to the application server 127.

Figure 13:
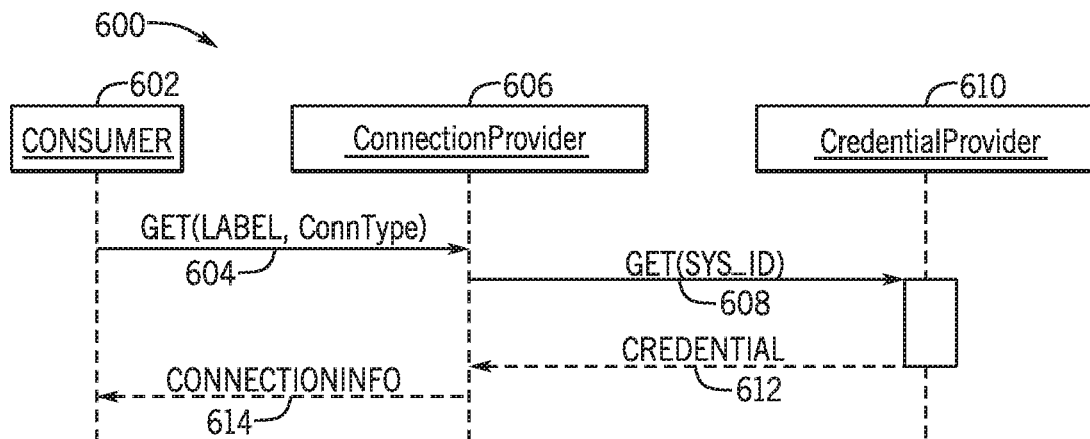
FIG. 13 illustrates a call flow that may be used when a persistent host is used, in accordance with an embodiment.

FIG. 13 illustrates a call flow 600 that may be used when a persistent host is used. For example, the call flow may be utilized in an orchestration process with a persistent host, a cloud management process, and/or other suitable processes where the target host is persistent. A consumer 602 performs the process (e.g., orchestration, cloud management, etc.) calling for a connection. In response, the consumer 602 sends a label request 604 to a connection provider 606. The connection provider 606 may be the connection table 402 or any other mechanism for returning connection information in response to the request 604. The connection provider 606 then sends a credential request 608 to a credential provider 610. The credential provider 610 may include the credential table 422 and/or any mechanism for returning credentials 612 in response to the credential request 608. In some embodiments, the connection provider 606 may include an extension to the connection table 402 to include the credentials 612. In such embodiments, the connection provider 606 may provide the credentials 612 without requesting information from the credential provider 610. Regardless of whether the connection provider 606 or the credential provider 610 provide the credentials 612. The connection provider 606 provides connection information 614 back to the consumer 602. The connection information 614 includes the credentials 612 for establishing a connection using the connection information 614.

Figure 14:
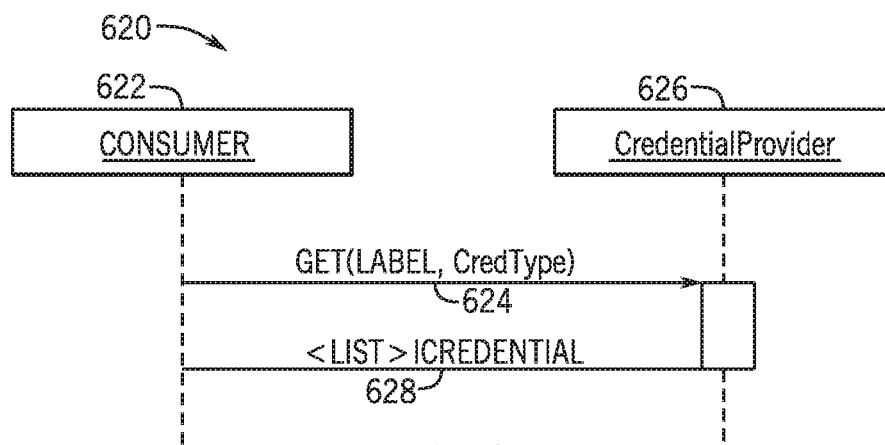
FIG. 14 illustrates a call flow for use when the runtime host is dynamically determined at runtime, in accordance with an embodiment.

FIG. 14 illustrates a call flow 620 for use when the runtime host is dynamically determined at runtime. A consumer 624 performs an action that is to use credentials. For example, the action may include discovery, service mapping, and/or other actions that utilize credentials. The consumer 624 then sends a credential request 626 to a credential provider 626 (e.g., connection table 402) that includes a label. During discovery, the label may be a null label. During service mapping, the label may be the table name of the CI 110 in the CMDB. In response to the request 626, the credential provider 626 provides credentials 628 to the consumer 624 to be used in the action.

Figure 15:
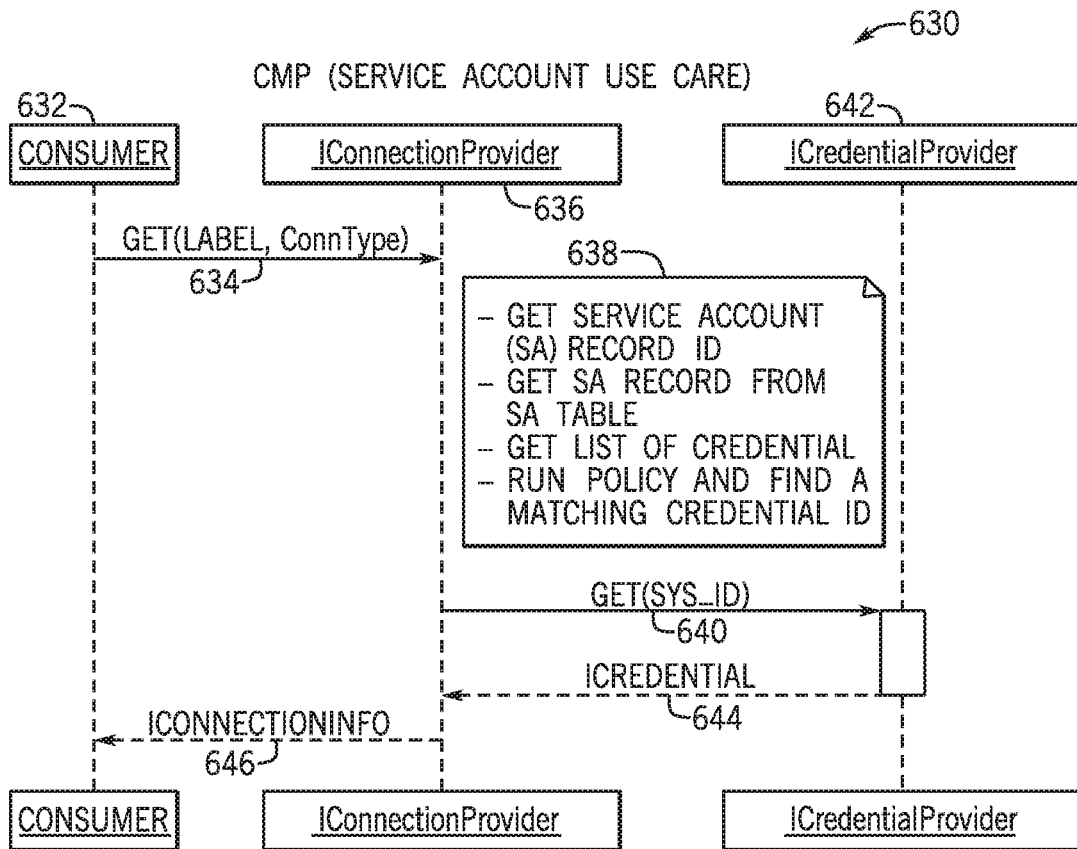
FIG. 15 illustrates a call flow for use when cloud management functions utilize a service account, in accordance with an embodiment.

FIG. 15 illustrates a call flow 630 for use when cloud management functions utilize a service account. A service account may be used to use APIs for monitoring/reporting functions. During cloud management, a consumer 632 (e.g., process/processor performing the cloud management) sends a request 634 to a connection provider (e.g. connection table 402) for connection information using a connection label. In response to the request 634, the connection provider 636 and/or a related processor selecting a suitable credential identifier (block 638). Selecting a suitable credential identifier includes obtaining a service account (SA) record identifier, getting a SA record from an SA table, get a list of credentials based on the SA record, and use policy to determine a matching credential identifier as the suitable credential identifier. After selecting a suitable credential identifier, the connection provider 636 requests 640 the credential from a credential provider 642 (e.g., credential table 422). The connection provider 636 responds with credential information 644 to the connection provider 636. The connection provider 636 then sends connection information 646 back to the consumer 632. The connection information 646 includes the credential information 644 from the credential provider 642.

Various aspects related to the foregoing connections and labels may be tested among other interactions using an automated testing framework (ATF). For example, the ATF may be used to test requests and responses to inbound APIs (e.g., REST APIs). Such functionality enables validation of functionality and simplification of upgrade/change processes to the APIs. For instance, a customer may be able to create a test indicating logic to be tested including one or more steps to perform. In some embodiments, the API requests/responses may be directly (e.g., manually) configured in the ATF and/or using an API interface that enables exploring APIs from the ATF. The test may be used to determine whether the response payload contains and/or is equal to a check value, determine whether a response payload element (e.g., in a JavaScript Object Notation, XML, or other format) exists, determine whether the payload element value contains and/or is equal to a check value, determine whether the payload is valid, determine whether the payload is well-formed, determine whether a response header exists, determine whether a response header value contains and/or is equal to a check value, determine whether a response status code contains and/or is equal to a check value, determine whether the response status code is greater than or less than a check value, determine whether the response has an error, determine whether the response error contains or is equal to a check value, and/or other suitable checks on a response to determine functionality using various testing criteria. In some embodiments, a maximum size of the request and/or the response payload may be configurable using the ATF or the underlying API being tested.

To enable such functionality in the ATF, the steps for the test being performed may be configured by defining a number of characteristics that affect how steps of a particular type of function, such as sending an API request. The characteristics may also include inputs used, actions performed during the function. The steps and/or step templates may also be organized into categories. These categories may be used to filter a step list when a new step is added to a test.

An environment for the step may also be defined (e.g., server-based versus browser-based execution). In some embodiments, an environment may be added to keep the response available for all following API (e.g., REST API) assertion steps. The response remains as long as the test is executed, and data collected after the execution is finished. During troubleshooting/testing maintaining the response provides an enhanced user experience by obviating a copy of the response manually between test steps. In other words, one or more (e.g., all) test steps following a sent API request will have access to the response object until the entire test has completed. Any steps using and/or sending an API request may be flagged appropriately (e.g., REST) for ease is finding the appropriate test steps.

Figure 16:
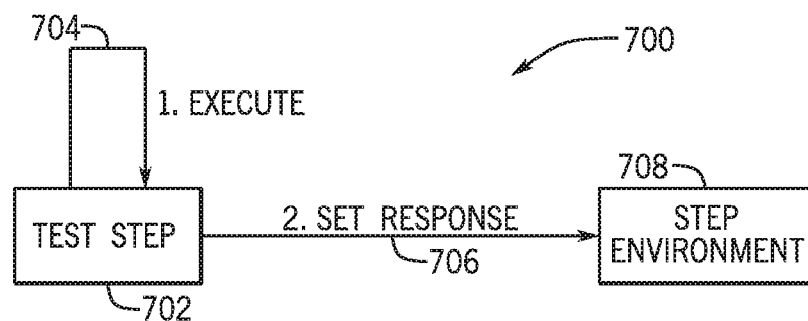
FIG. 16 illustrates a block diagram reflecting execution of testing, in accordance with an embodiment.

FIG. 16 illustrates a block diagram 700 reflecting execution of testing. A test step 702 workflow includes an API request that is executed 704. This API request sets a response 706 to the step environment used 708 to be used by other API step configurations to assert expectations against. Other API steps may access the step environment 708 using a common environment configuration setting (e.g., "Server-REST").

Inbound and outbound API request step configurations may cause different responses. For example, an inbound API request step configuration will start a batch execution and will be responsible for sending an inbound REST request and setting the response to the step environment. No assertions will be performed at this step so the user may test negative scenarios later. This step configuration will be used to create a test step by specifying request details manually on an ATF form using the following or comparable information:

TABLE 1

Test step details

| Name | Description |
| --- | --- |
| Basic authentication | A Basic authentication profile to be used to send the REST request |
| Method | A protocol (e.g., hypertext transfer protocol) method, such as GET, PUT, POST, DELETE, PATCH |
| Path | An API provided on the current instance endpoint without protocol, hostname and port |
| Query parameters | Request query parameters stored in a format (e.g., JSON) |
| Headers | Request headers stored in the format |
| Body | A request payload. The size may be limited by a system property. In some embodiments, the body may only be shown only for certain methods (e.g., PUT, POST and PATCH) |

An API explorer step configuration may also be used. The API explorer may provide the same functionality as the inbound step configuration previously discussed, but an API explorer may be opened and used to receive a selection of an API. The API explorer may also be used to receive specifications for request query parameters, request headers, request body (if used), and/or test the request in the explorer. When ready, the request may be saved as a new test step of a test that has been previously accesses. Upon saving, the API explorer may be redirected to a form where inputs may be reviewed and/or edited. If the selected API requires authentication, the user may select a basic authentication profile (e.g., credentials 452).

Figure 17:
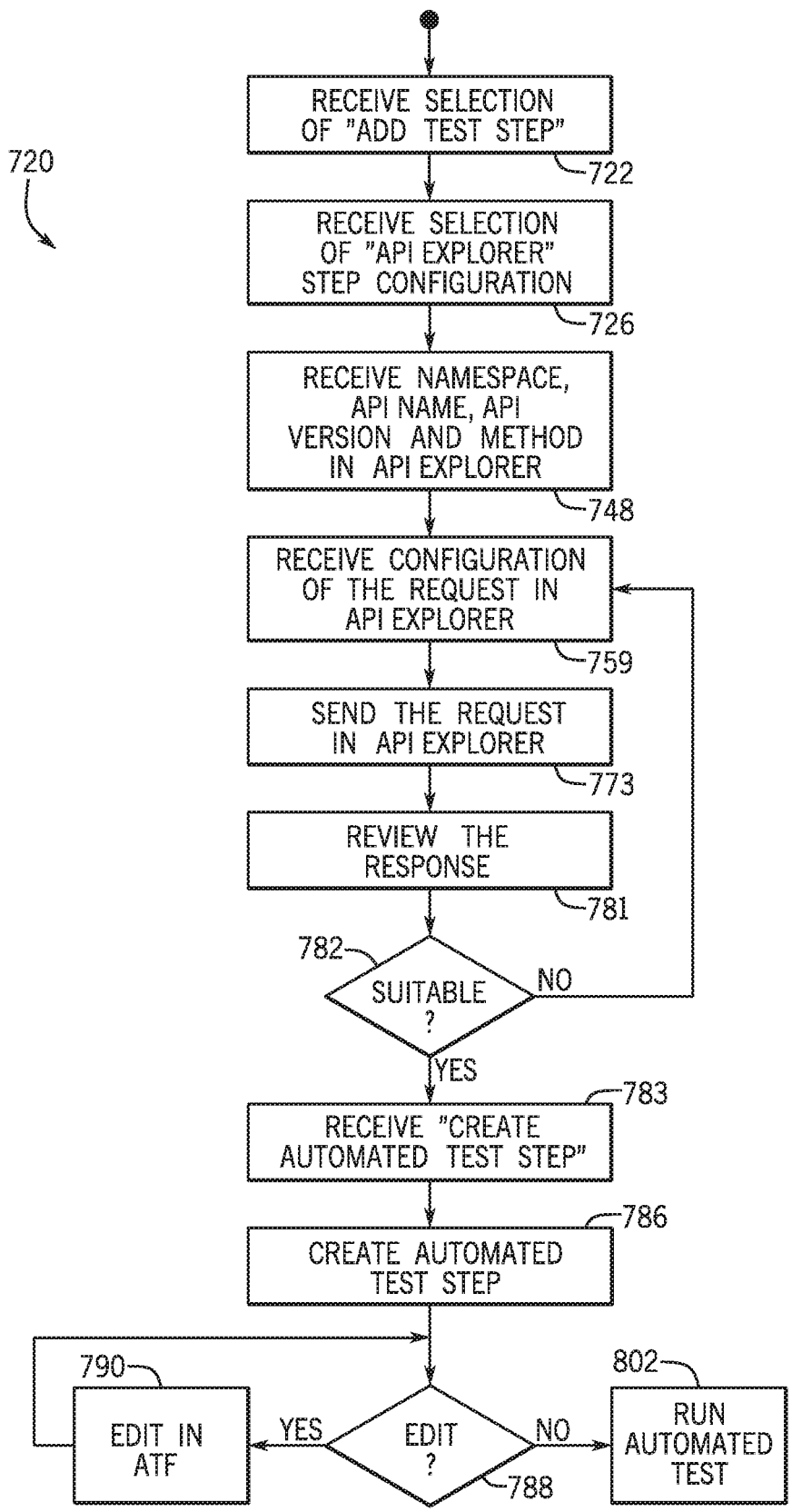
FIG. 17 illustrates a process for automating testing of API requests and/or responses, in accordance with an embodiment.
Figure 18:
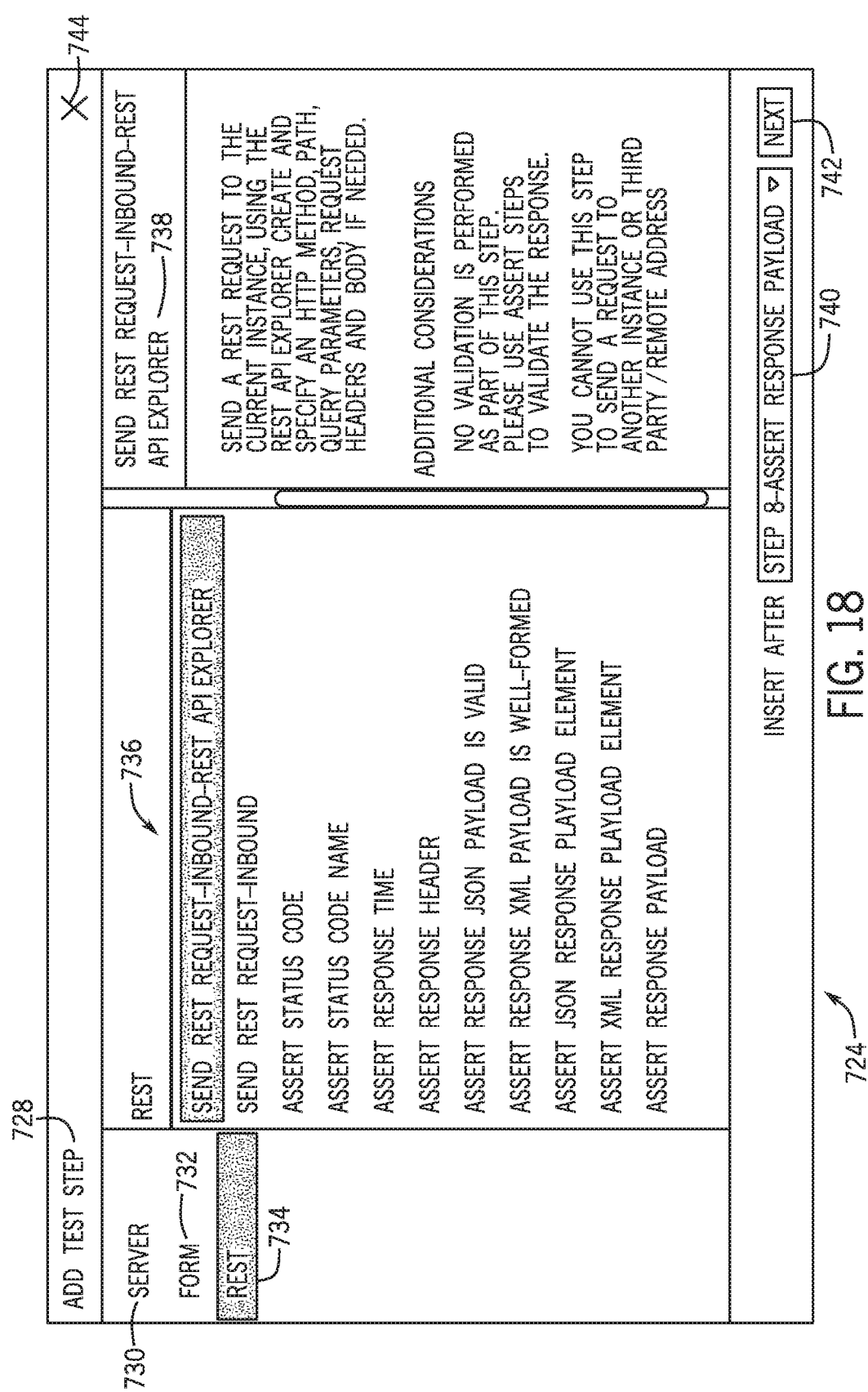
FIG. 18 illustrates an add step menu for automated testing, in accordance with an embodiment.

FIG. 17 illustrates a process 720 for automating testing of API requests and/or responses. The API testing includes receiving a selection of an "Add Test Step" or other indication that a test step is to be added and/or edited (block 722). The selection of the "Add Test Step" may include receiving a selection of a button or other menu item and causes presentation of Add Test Step menu, such as the Add Test Step menu 724 of FIG. 18. Returning to FIG. 17, the Add Test Step menu 724 may enable the ATF to receive selection of an API explorer (block 726). For example, the Add Test Step menu 724 may include a list 728 of test step types, such as a server test type 730, a form test type 732, and a REST test type 734. The server test type 730 may be used to select a test step that includes actions on a server. Similarly, the form test type 732 may be used to select a test step that involves creating and/or changing forms. The REST test type 734 may be used to access test steps that create or edit test steps related to REST APIs. However, in some embodiments, the REST test type 734 may be used to access APIs of other types and/or other categories of other API types may be added to the list 728. Upon selection of the REST test type 734 (or another item in the list 728), a list 736 of suitable tests are displayed in the Add Test Step menu 724. Highlighting an item in the list 736 may result in text 738 that describes the test. A location bar 740 may also be used to specify where in the new test is to be added in an order of items in a current test. Once the proper test step is selected from the list 736, a next button 742 may be selected to add the new test step or the addition of the new test step may be canceled using a cancel button 744.

Figure 19A:
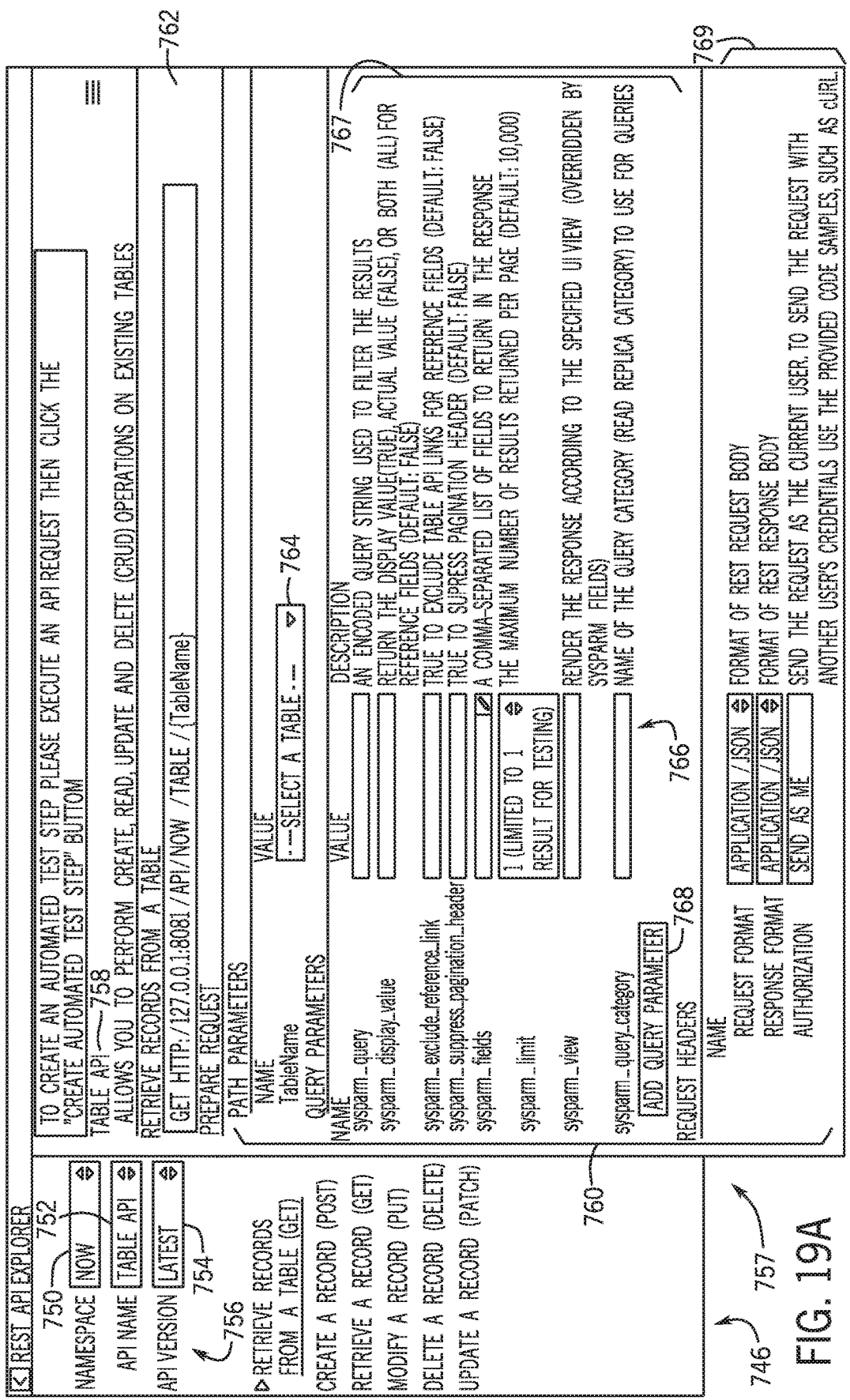
FIG. 19A illustrates a first portion of an API explorer used in automated testing, in accordance with an embodiment.
Figure 19B:
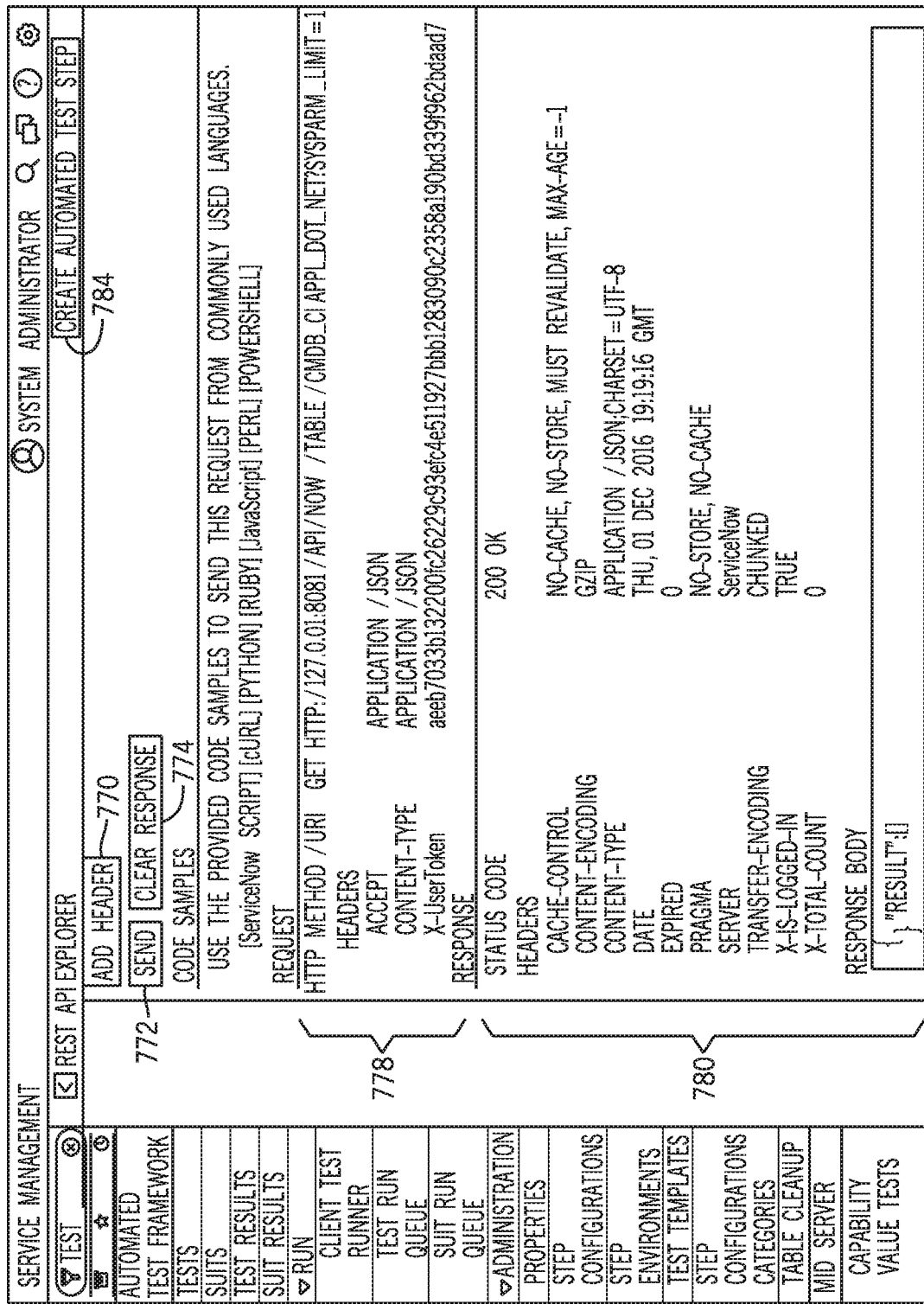
FIG. 19B illustrates a second portion of the API explorer of FIG. 19A, in accordance with an embodiment.

Once a test step has been selected with text indicating an API explorer, an API explorer may be displayed. For example, FIGS. 19A and 19B illustrate an example API explorer 746. Returning to FIG. 17, the API explorer 746 may be used to select a namespace, an API name, an API version, and/or a method (block 748). For example, in the API explorer 746, a namespace selector 750 may be used to select a namespace, such as indicating whether the test step occurs in a new namespace or in an existing namespace. The API explorer 746 also includes an API name selector 752 to select an API name, such as a Table API. Moreover, the API explorer 746 may include an API version selector 754 to select a version of the selected API name. Furthermore, in some embodiments, the API explorer 746 indicates a method selector 756. The method selector 756 may be used to select a method, such as a hypertext transfer protocol (HTTP) method for interacting with data (e.g., tables). The API explorer 746 may display a details frame 757 based upon selections made through the selectors 750, 752, 754, and/or 756. For example, the details frame 757 may include a description 758 about the API selected using the API selector 752.

Returning to FIG. 17, the details frame 757 may also be used to receive configuration of details of a request (block 759). For example, as illustrated in FIG. 19A, the details frame 757 includes request details 760 about definitions about the API request. For example, the illustrated request details 760 may include code 762 generated according to the request details 760. Moreover, the request details 760 may include a table name selector 764 for selecting a name of a table requested by/using the API. The request details 760 may include various table parameter inputs 766 that may be used to input, select, and/or edit various parameters used by the API function (e.g., query). One or more of the various table parameter inputs 766 may also be associated with corresponding descriptions 767 describing the parameter, a default value for the corresponding parameter, and/or effects from changing the parameter. The number of parameters may be modified by adding and/or deleting a number of parameters using a number change button 768. Request headers may also be modified using the request details 760 in a request header detail portion 769 of the request details 760.

In some embodiments, the API explorer 746 may include more information than may be suitably displayed on a single page. Accordingly, the API explorer 746 may be extended onto multiple portions that may be scrolled through and/or separate pages that may be navigated between. FIG. 19B illustrates a subsequent portion of the API explorer 746.

In FIG. 19B, the request header detail portion 769 may be extended and/or contracted using a number change button 770. Once the request details 760 are suitable, a send request button 772 may be selected. As illustrated in FIG. 17, selection of the send request button 772 causes the request to be sent (block 773). As previously noted in relation to FIG. 16, the sent request and/or its corresponding response is returned to the test step of the API explorer 746. As illustrated in FIG. 19B, the previously received response may be cleared using a clear response button 774 or may be overwritten by sending the current response using the send response button 772. In some embodiments, the API explorer 746 may be used to generate code to send the request sent using the send request button 772 using a code generation selector 776.

Since a previously sent request may differ from or be the same as a request detailed in the request details 760, a response to which a response has been received may be detailed in a request summary 778. A comparison of the request details 760 and the request summary 778 may be used to determine whether any changes exist in the request sent for response and the current request details 760 that may not have been "sent" yet.

Response details 780 may show results of a response from the API that is targeted with the request. The response details 780 indicate whether the API call completed. As illustrated in FIG. 17, the response details 780 may be used to review the response (block 781). The ATF and/or a user may determine whether the results are suitable (block 782). For example, if the API did not satisfy testing criteria set, the ATF may return a result that the response was not suitable. Additionally or alternatively, the ATF may utilize the response details 780 to enable a user to ascertain whether suitable functionality exists. If the response is suitable, a "Create Automated Test Step" may be selected (block 783). For example, in the API explorer 746 of FIG. 19B a create automated test step button 784 may be selected. In some embodiments, the create automated test step button 784 may not be displayed until a request is sent using the button 772, a response is received to the request, and/or the response has been validated against testing criteria.

In some embodiments, when a change has been made to the request details 760 after sending a request, the create automated test step button 784 may be suppressed. For example, the create automated test step button 784 may be replaced with text indicating that the current details have not been tested. Additionally or alternatively, an alternative button may be presented to proceed with creating the automated test step with details that have been sent even if they differ from details in the request details 760.

Figure 20:
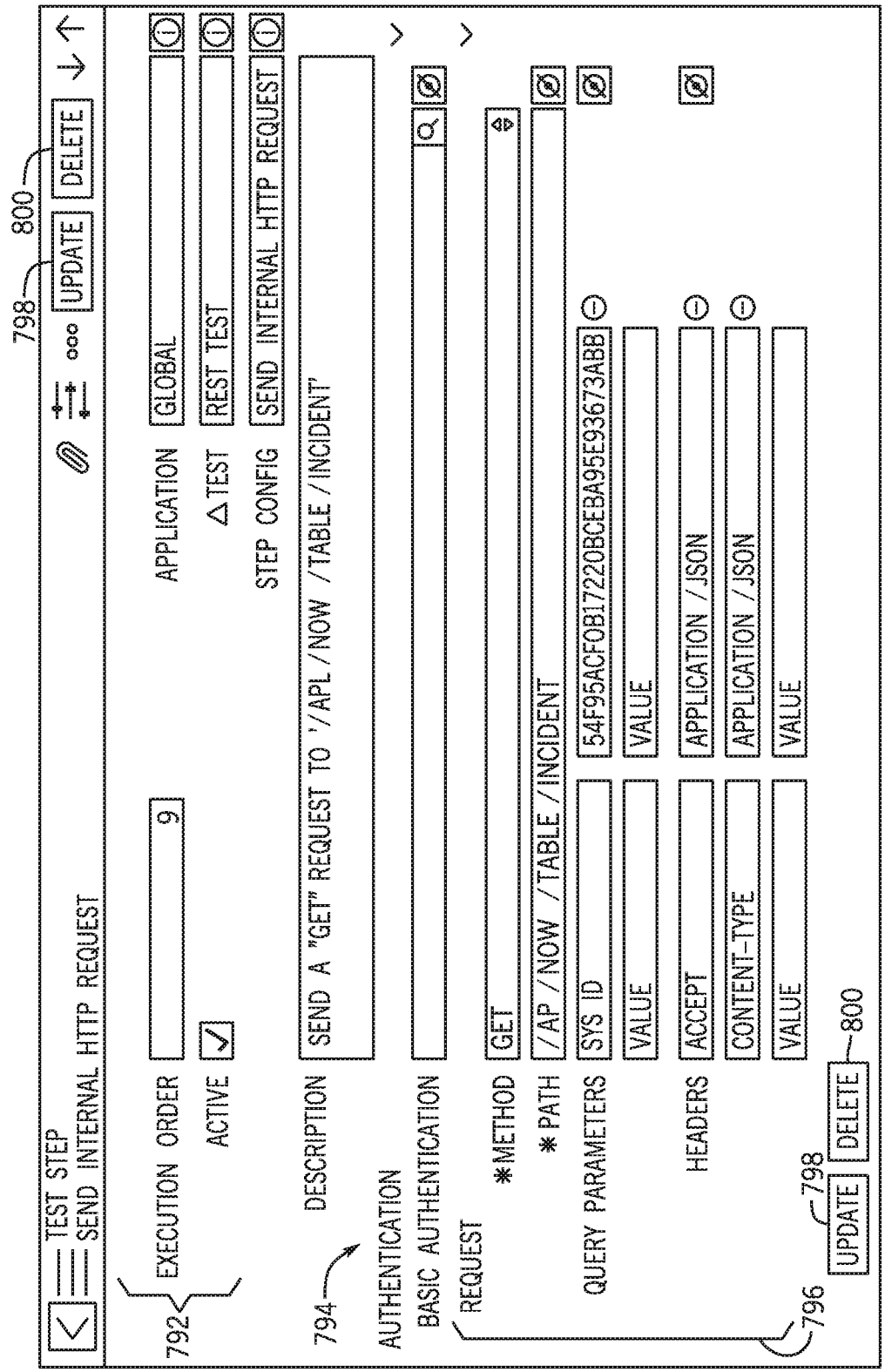
FIG. 20 illustrates an ATF edit screen used to edit steps of a test performed in an automated testing function.

Returning to FIG. 17, once the test step selection to create the automated test step is made, the automated test step is created (block 786). At some later time, the ATF determines whether the created test step is to be edited (block 788). For example, the ATF may receive a selection of a current test step. In some embodiments, the ATF may make the API explorer 746 may be unavailable for editing current tests and available only for new tests. Instead, in such embodiments, the ATF itself is used to edit the test step (block 790). For example, FIG. 20 illustrates an ATF edit screen 791 that may be used to edit a test step. The ATF edit screen 791 may include step information 792 about the test step. For example, the step information may include whether the step is active, where the step is located in order in the test, a description of the test, applicability of the test, a name of the test, and/or configuration information about the step or associated test.

The ATF edit screen 791 may also enable changing credentials used for the test step via a credential selector 794. The ATF edit screen 791 may also enable selection and/or changing details about the request in a request details portion 796. Any changes in the request details portion 796 may be saved using an update button 798 or abandoned using a delete changes button 800. Regardless of whether the test step is edited using the ATF or the API explorer 746, the ATF may run the automated test (block 802). In some embodiments, the automated test may be run according to user demand and/or a schedule for running the automated test.

Figure 21:
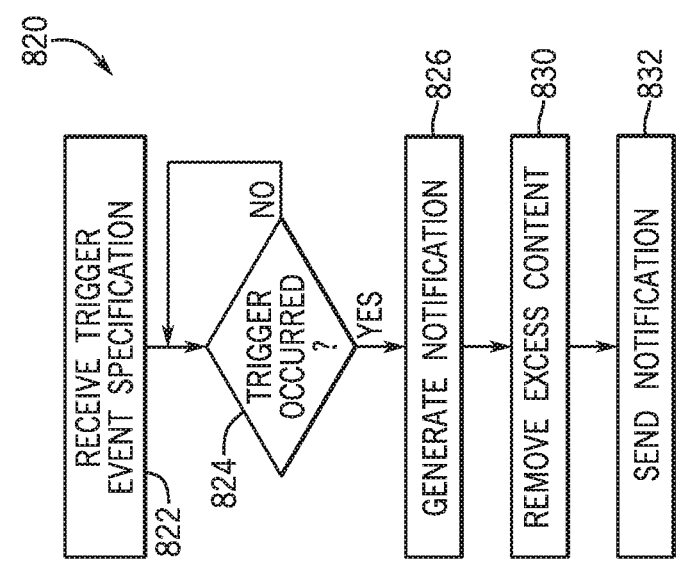
FIG. 21 illustrates a process for sending notifications, in accordance with an embodiment.

FIG. 21 illustrates a process 820 to send notifications. The notifications may include mobile device notifications (e.g., short message service), desktop notifications (e.g., popups in an application, browser, and/or notification window), email notifications, and/or audio notifications to inform of messages and/or other activity. Notification preferences may be set in the platform 104. These notification preferences may be set differently for each conversation and/or may be set globally for multiple conversations. The notification preferences may also be used to indicate what circumstances result in a notification. In other words, the notification preferences may be used to set a trigger that will trigger the notification based on satisfied criteria. Furthermore, different types of notification may be set differently. For example, a member of a large group conversation may want to receive mobile, desktop, and email notifications for all activity but audio notifications only when someone mentions the member. Additionally, certain types of notifications may be disabled entirely for a conversation.

Returning to FIG. 21, trigger event specification is received in the platform 104 (block 822). The trigger event specification may include specifying an event that may cause the corresponding trigger. For example, the trigger may include a button in a form to send a report an as attachment in an email as a notification. Additionally or alternatively, a notification (e.g., email) may be automatically generated when a specific step (e.g., testing) in a project is reached, when a new electronic communication is initiated in a corresponding conversation and/or group of conversations in an electronic forum, when a test has begun, completed, and/or failed in the ATF, and/or when other actions are completed using the platform 104. The trigger event specification may also include the notification preferences previously discussed to establish what type of notification is to be sent, how many notifications of available types are to be sent, whether notifications are to be batched, whether notifications are to be stripped of excess content (e.g., logos, redundant images/data, etc.), and/or other actions to be performed on the notifications before sending the notifications.

After receiving a specification of the trigger event, the platform 104 determines whether the trigger has occurred (block 824). If the event has not occurred, the platform 104 may wait until the trigger has occurred. If the event has occurred, the platform 104 may generate the notification based at least in part on the trigger event specification (block 826). For example, a notification (e.g., email, SMS message) may be autogenerated, a text, a notification may be generated using information input into a user interface prior to selecting a button to send the notification, a single notification identifying multiple trigger events may be generated, and/or other suitable notifications for indicating the event has occurred or providing information about causes for the event may be generated.

In some embodiments, the platform 104 may remove excess content (block 830). For instance, the platform 104 may remove logos (e.g., corporate logos), remove duplicate images, remove duplicate attachments, and/or other content that is not a part of the data intended for a target recipient. In some embodiments, the platform 104 may hash attachments to determine whether the attachments are duplicates of each other.

Once the excess content is removed from the notification, the notification is sent (block 832). By removing excess content, congestion of a recipient and/or sender's inbox/outbox may be reduced and/or eliminated because extraneous/redundant content is not transported.

Figure 22:
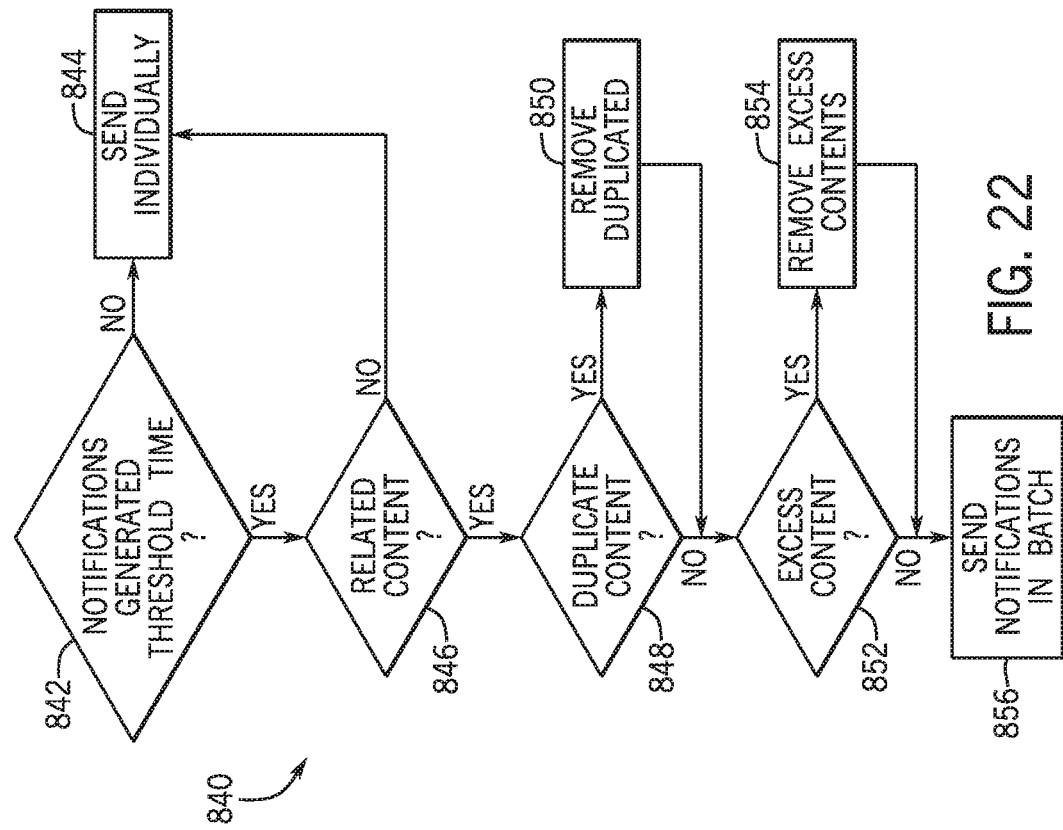
FIG. 22 illustrates a process for sending notifications using notification batching, in accordance with an embodiment.

FIG. 22 illustrates a process 840 for sending notifications using notification batching of generated notifications. The process 840 includes determining whether notifications are generated within a threshold of time of each other (block 842). This threshold may be established using the trigger even specification (e.g., notification preferences) and/or may be set globally through the platform 104. In some embodiments, batching may be disabled by setting the threshold to a certain value (e.g., zero).

If the notifications are not generated within the threshold of each other, the notifications are sent individually (block 844). In some embodiments, sending individually includes removing excess content for each notification, as previously discussed. In some embodiments, the generated notifications may be batched in some cases (e.g., content is related). Thus, in such embodiments, the platform 104 determines whether the notifications contain related content (block 846). In some embodiments, related content may include common topics (using one or more tags), common sender, common recipient, and/or other factors that may indicate that the notifications are similar in at least one aspect. In such embodiments, if the content is not related, the notifications are sent individually.

Among the notifications, the platform 104 may determine whether there is duplicate content in the notifications (block 848). In some embodiments, duplicate content may include redundant figures, text, and/or other content that is included in the notifications. In some embodiments, content is considered duplicate only if it appears in a same notification more than once. Alternatively, the content may be considered duplicate if the content appears in any of the batched notifications more than once. Furthermore, in some embodiments, content may be considered duplicate only if the content appears in notifications of the same type. For example, if two emails include the same image, the image is considered duplicate between the emails while an image in a desktop notification and an email is not considered duplicate. Furthermore, duplicate content may refer to attachments to the notifications. To determine whether the attachments are duplicates, the platform 104 may hash the attachments and compare hashed values to determine whether the attachments are duplicates.

If duplicate content is found in the notification(s), the duplicate content is removed (block 850). Removing the duplicate content may include stripping the content out of the notification. In some embodiments, removing the content may include stripping out the duplicate content while inserting an indicator that duplicate content has been removed. Additionally or alternatively, when duplicate content has been removed, an indicator may be insert to indicate where the content that has been removed may be found. For example, an email may identify another batched email. Moreover, in some embodiments, such notification referencing may be made only when duplicate content is removed across notification types. For example, an SMS message may indicate that duplicate content has been removed but may be found in an email sent to a specific email address at a specific date and time.

In some embodiments, where to keep duplicate content may be prioritized using the trigger event specification (e.g., notification preferences) and/or chronological order. For example, if the notification is to be sent over SMS and email. The SMS notification may have duplicate information stripped out while the information is kept in the email message. In some embodiments, this may be dynamically determined based on bandwidth and/or usage of the mechanisms used to transport the notifications. For example, the notification preferences may track cellular usage and email box storage to determine which notification may more easily accommodate the duplicate data. For instance, if the cellular data usage is low, but the email box is almost full, the SMS notification may include the duplicate content while the email notification does not.

The platform 104 may also have certain data that is not to be included in notifications, such as corporate logos. The platform 104 determines whether any proscribed data types are included in the notifications (block 852). To reduce data congestion/consumption, this excess data may be omitted from the notifications (block 854). Once the excess content has been removed, the notifications may be sent in a batch (block 856).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   non-transitory memory; and
   one or more hardware processors configured to read instructions from the non-transitory memory to perform operations comprising:
      receiving one or more trigger event specifications that define one or more trigger events that will cause notifications to be transmitted;
      determining that the one or more trigger events have occurred;
      responsive to the determination that the one or more trigger events have occurred, generating a first notification that uses a first delivery mechanism;
      responsive to the determination that the one or more trigger events have occurred, generating a second notification that uses a second delivery mechanism;
      determining that excess content is to be included in the first notification based on usage or availability of resources of the first delivery mechanism or the second delivery mechanism;
      including the excess content in the first notification; and
      sending the first notification and the second notification, wherein the first notification includes the excess content that is not included in the second notification.

2. The system of claim 1, wherein the first notification comprises information populated from circumstances of the one or more trigger events.

3. The system of claim 1, wherein the first notification comprises information input in a user interface during receiving the one or more trigger event specifications.

4. The system of claim 1, wherein the first delivery mechanism comprises a mobile device notification mechanism, a desktop notification mechanism, an email notification mechanism, an audio notification mechanism, or any combination thereof.

5. The system of claim 1, wherein the one or more trigger events comprise one of the following trigger event types: a selection of a button, new communication in an electronic forum-based conversation, a step in a project has been reached, an automated test in an automated test framework (ATF) has begun, the automated test in the ATF has completed, the automated test in the ATF has failed, or any combination thereof.

6. The system of claim 5, wherein the first notification corresponds to a first type of the trigger event types, and the second notification has a second type of the trigger event types.

7. The system of claim 1, wherein the excess content comprises images in the first notification that are excluded from the second notification.

8. The system of claim 1, wherein the excess content comprises an attachment to the first notification that is excluded from the second notification.

9. The system of claim 1, wherein the operations comprise:
determining whether the first and second notifications are generated within a threshold time of each other; and
responsive to the determination that the first and second notifications are generated within the threshold time of each other, batching the first and second notifications, wherein sending the first and second notifications comprises sending the batched first and second notifications.

10. The system of claim 1, wherein the second delivery mechanism comprises a mobile device notification, a desktop notification, an email notification, an audio notification, or any combination thereof.

11. A method, comprising:
determining that a first trigger event has occurred;
responsive to the determination that a first trigger event has occurred, generating a first notification that uses a first delivery mechanism;
determining that a second trigger event has occurred;
responsive to the determination that the second trigger event has occurred, generating a second notification that uses a second delivery mechanism;
determining that the first and second notifications are generated within a threshold time of each other;
responsive to the determination that the first and second notifications are generated within the threshold time of each other, batching the first and second notifications; and
sending the first and second notifications in a batch with the first notification including excess content that is not included in the second notification, wherein the excess content is to be included based on the usage or availability of resources of the first delivery mechanism or the second delivery mechanism.

12. The method of claim 11, wherein the excess content comprises an attachment that is attached to the first notification and not to the second notification.

13. The method of claim 11, comprising:
determining that a third and fourth notification are not sent within the threshold time of each other; and
responsive to the determination that the third and fourth notifications are not generated within the threshold time of each other, sending the third and fourth notifications individually for each notification comprises removing excess content in each notification sent separately.

14. The method of claim 11, wherein the excess content is included in the first notification based at least in part on a notification priority of the first notification being higher than a notification priority of the second notification.

15. The method of claim 14, wherein sending the second notification comprises inserting an indication of omission of the excess content from the second notification.

16. Tangible, non-transitory, and computer-readable medium having instructions stored thereon that, when executed, are configured to cause one or more processors to:
receive one or more trigger event specifications that defines one or more trigger events that will cause notifications to be transmitted;
determine that the one or more trigger events have occurred;
responsive to the determination that the one or more trigger events have occurred, generate a first notification that uses a first delivery mechanism;
responsive to the determination that the one or more trigger events have occurred, generate a second notification that uses a second delivery mechanism; and
send the first notification and the second notification, wherein the first notification includes excess content that is not included in the second notification, wherein the excess content is to be included based on the usage or availability of resources of the first delivery mechanism or the second delivery mechanism.

17. The tangible, non-transitory, and computer-readable medium of claim 16, wherein the excess content is included in the first notification based at least in part on the first notification having a higher notification priority than the second notification.

18. The tangible, non-transitory, and computer-readable medium of claim 16, wherein the first delivery mechanism comprises a mobile device notification mechanism, a desktop notification mechanism, an email notification mechanism, an audio notification mechanism, or any combination thereof.

19. The tangible, non-transitory, and computer readable medium of claim 16, wherein the availability of the first delivery mechanism or the second delivery mechanism comprises an amount of email box storage available.

20. The tangible, non-transitory, and computer readable medium of claim 16, wherein the usage or availability of the first delivery mechanism or the second delivery mechanism comprises an amount of cellular data used for the first delivery mechanism or the second delivery mechanism.

* * * * *